(12) United States Patent
Van Der Westhuysen

(10) Patent No.: US 6,224,757 B1
(45) Date of Patent: May 1, 2001

(54) TREATMENT OF LIQUIDS

(75) Inventor: Johannes Petrus Willem Van Der Westhuysen, Western Cape (ZA)

(73) Assignee: Rapsol Twenty Seven Close Corporation, Stellenbosch (ZA)

( * ) Notice: Subject to any disclaimer, the term of this patent is extended or adjusted under 35 U.S.C. 154(b) by 0 days.

(21) Appl. No.: 09/149,980

(22) Filed: Sep. 9, 1998

(30) Foreign Application Priority Data

Sep. 10, 1997 (ZA) ...................................................... 97/8149

(51) Int. Cl.$^7$ ...................................................... C02F 1/00
(52) U.S. Cl. ............................................. 210/170; 210/219
(58) Field of Search .................................... 210/170, 205, 210/219, 220, 747, 758, 760, 208, 174; 166/276, 311; 405/128; 366/102; 261/84

(56) References Cited

U.S. PATENT DOCUMENTS

| | | | |
|---|---|---|---|
| 5,180,503 | * | 1/1993 | Gorelick et al. ...................... 210/758 |
| 5,248,613 | * | 9/1993 | Boubicek ............................... 210/219 |
| 5,318,698 | * | 6/1994 | Bernhardt .............................. 210/170 |
| 5,688,076 | * | 11/1997 | Atkins .................................. 210/170 |
| 5,849,201 | * | 12/1998 | Bradley ................................ 210/752 |

FOREIGN PATENT DOCUMENTS

| | | | |
|---|---|---|---|
| 39 31 011 | * | 3/1991 | (DE) . |
| 42 04 059 | * | 8/1993 | (DE) . |
| 899051 | * | 1/1982 | (SU) . |

* cited by examiner

*Primary Examiner*—David A. Simmons
*Assistant Examiner*—Frank M. Lawrence
(74) *Attorney, Agent, or Firm*—Skinner and Associates

(57) ABSTRACT

A mass transfer device for use in the treatment of an impure liquid includes a housing into which the impure liquid and a reagent are to be introduced, the housing having a side wall. The device also includes an impeller assembly, including a plurality of impeller blades, rotatably mounted in the housing, at least one impeller blade having a tip which terminates in close proximity to an interior surface of the side wall of the housing and the or each impeller blade being shaped ad dimensioned to impart shear forces, at its tip, to liquid and reagent located between the side wall and the tip and to generate a low pressure region at a trailing end of the said tip upon rotation of the blade relative to the side wall, thereby enhancing a reaction between the reagent and impurities in the liquid. The invention also relates to a method of and equipment for treating an impure liquid.

16 Claims, 3 Drawing Sheets

TREATMENT OF LIQUIDS

BACKGROUND OF THE INVENTION

THIS INVENTION relates to the treatment of liquids. More particularly, the invention relates to a mass transfer device fur use in the treatment of an impure liquid, a method of treating an impure liquid, equipment for treating an impure liquid and a component for a borehole for use in the treatment of impure liquids.

SUMMARY OF THE INVENTION

According to a first aspect of the invention, there is provided a mass transfer device for use in the treatment of an impure liquid, the mass transfer device including a housing into which the impure liquid and a reagent are to be introduced, the housing having a side wall; and an impeller assembly, comprising a plurality of impeller blades, rotatably mounted in the housing, at least one impeller blade having a tip which terminates in close proximity to an interior surface of the side wall of the housing and the or each impeller blade being shaped and dimensioned to impart shear forces, at its tip, to liquid and reagent located between the side wall and the tip and to generate a low pressure region at a trailing end of the said tip upon rotation of the blade relative to the side wall, thereby enhancing a reaction between the reagent and impurities in the liquid.

The side wall may be foraminous having openings which are defined in the side wall for allowing flow of the liquid and the reagent from and back into the housing.

The reagent may be gaseous with the openings in the side wall being dimensioned according to physical and dynamic parameters of the device and providing the required resistance to movement through them when the liquid and the reagent are expelled from the housing through the openings.

The tip of each impeller blade may have an edge portion which complements the shape of the interior surface of the side wall. At least the tip of the or each impeller blades may be formed of a catalytic material for enhancing catalytic reaction between the impurities in the liquid and the reagent.

The catalytic material may be selected from the group comprising platinum group metals and may be vanadium-pentoxide.

According to a second aspect of the invention, there is provided a method of treating an impure liquid which includes the steps of introducing the impure liquid into a housing of a mass transfer device;

introducing a reagent into the housing of the mass transfer device; and causing rotation of an impeller blade inside the housing thereby imparting shear forces on liquid and reagent located between a tip of the blade and an interior surface of a side wall of the housing and generating a lower pressure zone at a trailing edge of said tip, so that a reaction between the reagent and impurities in the liquid is enhanced.

The method may include the step of discharging treated water into a soil matrix. The method may further include introducing excess reagent into the mass transfer device to enable residual reagent to be entrained in the treated water; and discharging the treated water with the residual reagent through outlet openings of discharge tubes into the soil matrix to effect reaction of contaminants in the soil matrix with the residual reagent. In a preferred embodiment of the invention, the treated water is discharged into the soil matrix to effect oxidation of absorbed organic contaminants in the soil matrix effecting soil washing and leaching and stimulating bacterial activity for further breakdown of adsorbed and absorbed soil contamination.

According to a third aspect of the invention, there is provided equipment for treating an impure liquid, the equipment including a vessel into which the impure liquid is to be fed;

at least one mass transfer device mountable within the vessel, the device having an impeller assembly which is located inside a housing;

a reagent supply means for supplying reagent to the mass transfer device in the vessel; and a drive means for causing rotation of the impeller assembly inside the housing.

The reagent may be in the in the form of an oxidant or a reducing agent. The oxidant may be a gaseous oxidant. In particular, the oxidant may be ozone. Thus, the reagent supply means may be an ozone generator which, in use, is mounted above ground surface level or an ozonator installed underground. The reducing agent may be in the form of hydrogen.

The equipment may include a retention means arranged within the vessel upstream from the, or a top mass transfer device, for absorbtion of impurities which are contained in treated water which issues from the mass transfer device. The retention means may be arranged between an upper water impervious packer and a lower water impervious packer. The retention means may comprise a packing of activated carbon, zeolyte, resin, or the like carried in the borehole casing between the lower packing element and the upper packing element. The retention means may serve to enhance oxidation or reduction of complex organic hydrocarbons present in the liquid.

The vessel may be in the form of a borehole casing sunk into a soil matrix. The equipment may include a pump for drawing contaminated liquid to be treated into an interior of the borehole casing at an operatively lower elevation of the borehole casing. It will be appreciated that the borehole casing is of such a length that a lower end of the borehole casing will lie below a surface of the subterranean water, i.e. below the surface of the water table. Then, the borehole casing may include openings arranged about its circumference via which the water can enter the borehole casing.

In a preferred embodiment of the invention, only a lower region of the borehole carries the openings. A filtering means may be arranged about an outer periphery of the lower region of the borehole for inhibiting the ingress of detritus into the borehole casing. The filtering means may be in the form of a gravel pack including graded silica sand.

The equipment may also include a drive means which, in use, drives both the pump and the impeller assembly of the mass transfer device. The drive means may be an electric motor.

The equipment may further include a discharge means for discharging treated liquid from the vessel. The discharge means may include a discharge conduit comprising a plurality of discharge tubes extending radially outwardly from the discharge end of the vessel and having at least one outlet opening which extends into a soil matrix. The discharge means may be arranged below the surface of the ground, at various depths, defined by the hydraulic behaviour of the soil matrix and the yield of the borehole. An annular betonite or cement slurry seal may be located between the vessel and the soil matrix to inhibit flow of treated liquid back into the vessel.

The vessel may alternatively be in the form of a free standing vessel which is used at ground surface level.

According to a fourth aspect of the invention, there is provided a component for a borehole for use in the treatment of impure liquids, the component including a borehole casing, only an operatively lower region of which is screened.

In this specification, the term "impure liquid" includes subterranean contaminated liquids such as water containing industrial effluents and/or metals and hydrocarbon-contaminated water, unless the context clearly indicates otherwise.

In this specification, the term "screened" means, unless the context clearly indicates otherwise, openings defined in the casing.

The invention is now described by way of example with reference to the accompanying diagrammatic drawings.

DETAILED DESCRIPTION OF THE DRAWINGS

Figure 1:
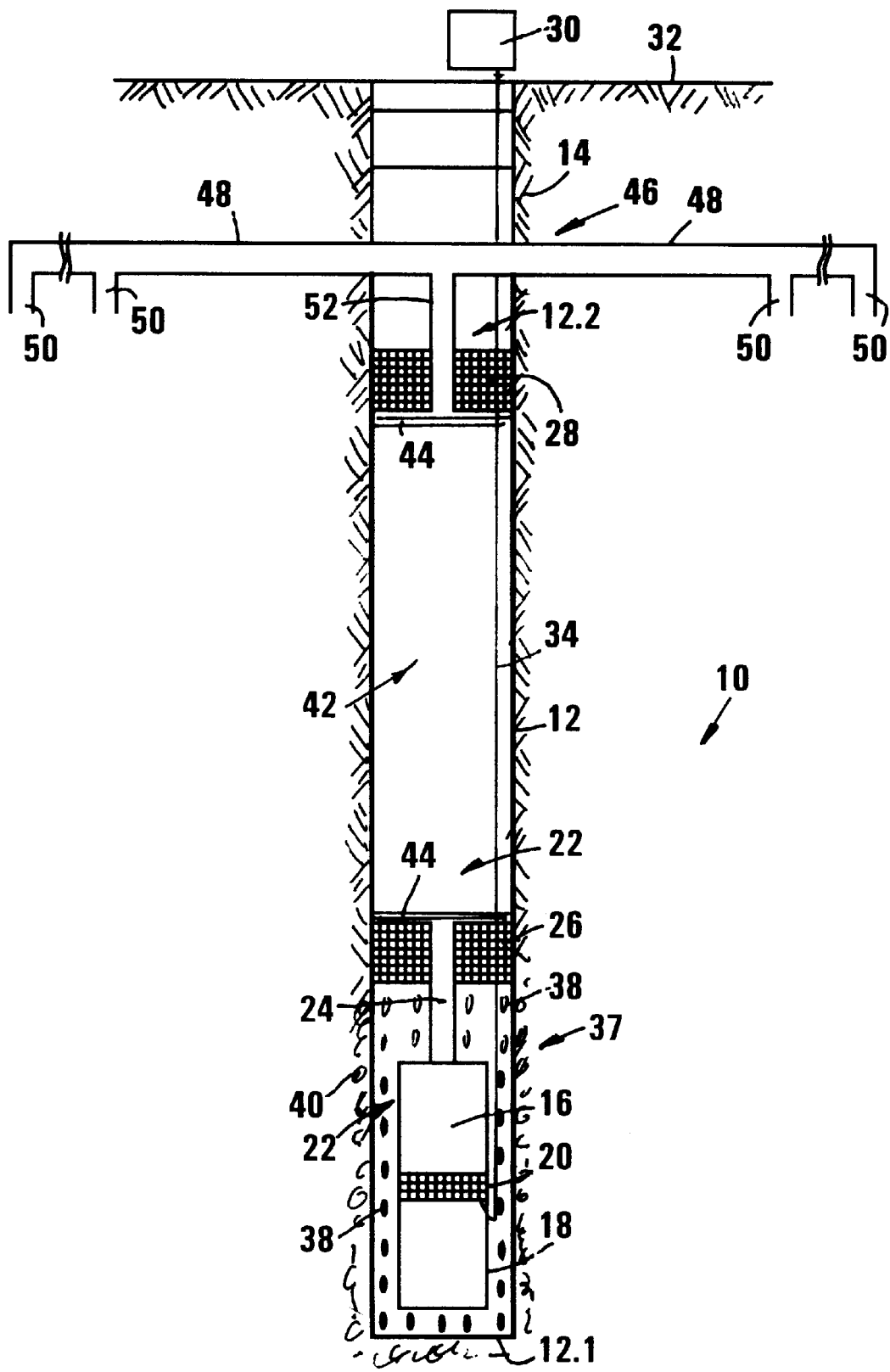
FIG. 1 shows a schematic, sectional side view of equipment, in accordance with one embodiment of the invention, for treating contaminated liquids.
Figure 2:
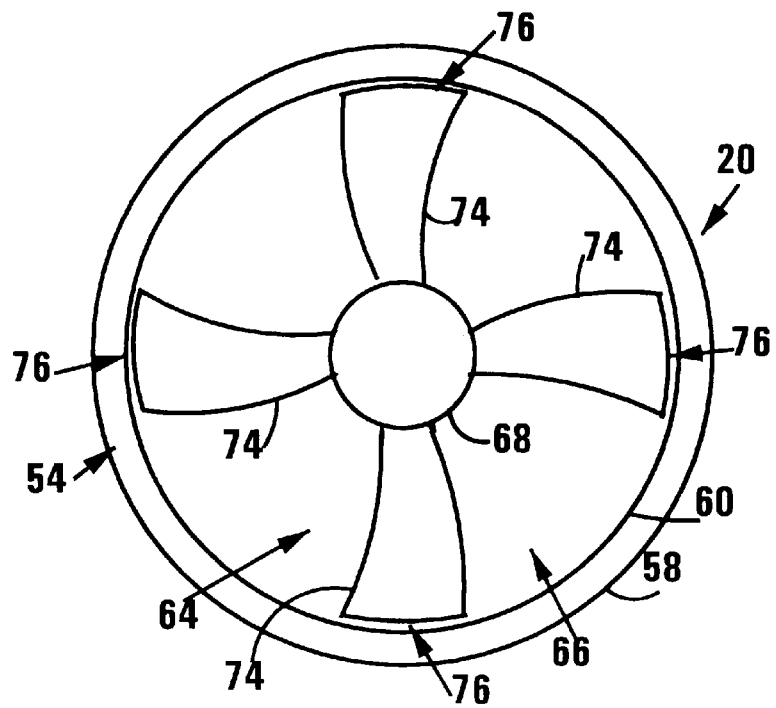
FIG. 2 shows a schematic, plan view of a mass transfer device of the equipment.
Figure 3:
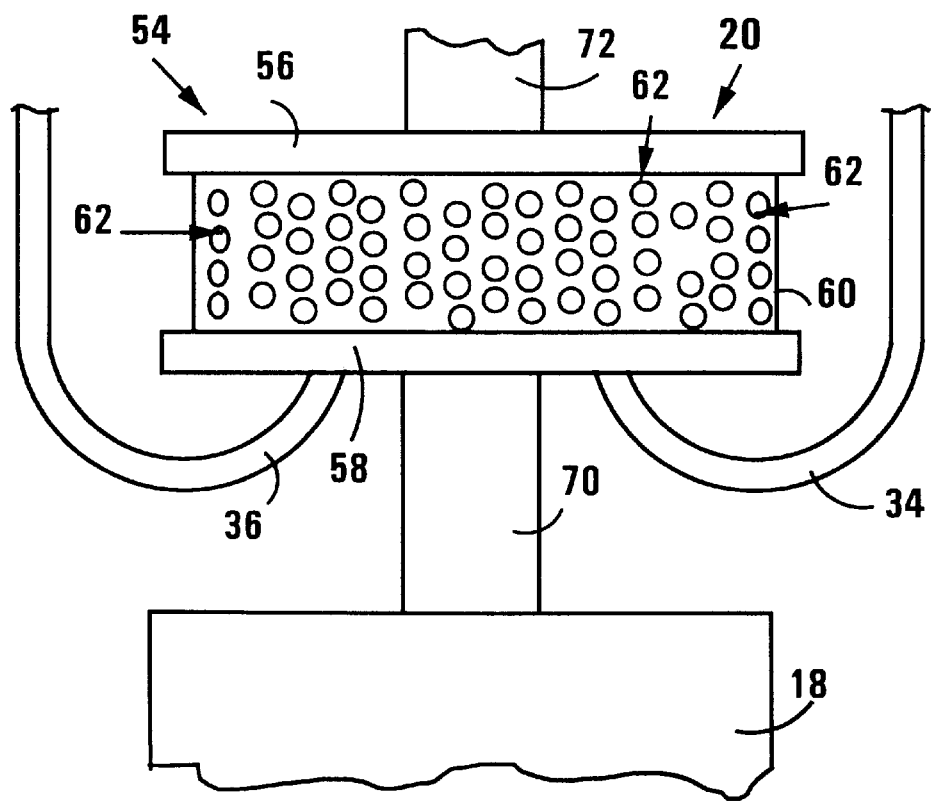
FIG. 3 shows a schematic side view of the mass transfer device.

Referring to FIGS. 1 to 3 of the drawings, equipment, in accordance with one embodiment of the invention, for treating impure liquids such as contaminated liquids, is illustrated and is designated by the reference numeral 10. The equipment 10 comprises a vessel 12 in the form of a borehole casing sunk into a soil matrix 14. The equipment 10 includes a borehole pump 16 arranged proximate a blower end 12.1 of the casing 12. A motor 18 is mounted below the borehole pump 16 for driving the pump 16, in use.

A mass transfer device 20 is mounted intermediate the pump 16 and the motor 18.

Water pumped by the pump 16 is drawn in from the matrix 14 into an interior 22 of the casing 12 and is then discharged into part 42 of the interior 22 via a feed pipe 24. The feed pipe 24 opens out through a lower packer 26 and an upper packer 28 is arranged in vertically spaced relationship proximate a discharge end 12.2 of the borehole casing 12.

The equipment 10 includes a supply of oxidant in the form of an ozone generator 30 which is mounted above ground level 32. The ozone generator supplies ozone via a feed conduit 34 to the mass transfer device 20. If desired, a second oxidant can be fed into the mass transfer device 20 via a second feed conduit 36 (FIG. 3). The second oxidant can be hydrogen peroxide which creates an hydroxyl radical.

The borehole casing 12, in the region 37 below the lower packer 26, is screened, i.e. has a plurality of openings 38 defined therein via which water to be treated is drawn into the interior of the borehole casing 12.

A filtering medium in the form of a gravel pack 40 is arranged around said lower region 37 of the borehole casing 12 for inhibiting the ingress of detritus into the interior 22 of the borehole casing 12. It is required that only the lower region of the borehole casing 12 is screened rather than the entire casing so that flow of liquid is directed towards the said lower region 37

If desired, that part 42 of the interior of the borehole casing 12 between the lower packing element 26 and the upper packing element 28 is filled with a retention medium in the form of activated carbon for enhancing carbon in the part 42 of the interior 22 of the casing 12.

The equipment 10 includes a discharge conduit 46 arranged at the discharge end 12.2 of the borehole casing 12 below ground surface level 32. The discharge conduit 46 comprises a plurality of discharge tubes 48 projecting radially outwardly from the discharge end 12.2 of the borehole casing 12. Each discharge tube 48 has a plurality of outlet openings 50 through which treated water is discharged into the soil matrix 14, as will be described in greater detail below. An annular region between the casing 12 and the outlet openings 50 may be sealed off to inhibit flow of treated water back into the casing 12.

Water from the borehole casing is fed to the discharge conduit 46 via a feed pipe 52 extending through the upper packing element 28.

Referring now to FIGS. 2 and 3 of the drawings, the mass transfer device 20 is illustrated in greater detail. The mass transfer device 20 comprises a housing 54 having a generally cylindrical shape when viewed in plan view, the housing an upper cover 56 and a lower cover 58 arranged on opposed sides of an annular side wall 60. The side wall 60 is foraminous having a plurality of apertures 62 defined therein. It is to be noted that the upper cover 56 is omitted from FIG. 2 for the sake of clarity.

An impeller assembly 64 is rotatably mounted within an interior 66 of the housing 54. The impeller assembly 64 comprises a central boss 68 which is mounted rotatably fast with an output shaft 70 from the motor 18. A further drive shaft 72 drives the pump 16.

A plurality of impellers 74 project radially outwardly from the boss 88. Each impeller 74 flares outwardly towards its tip 76 and is curved, as illustrated. Each tip 76 terminates with limited clearance short of an inner surface of the side wall 60. Typically, the clearance between the tip 76 and the side wall 60 is in the order of 1 to 3 mm or less. Further, an edge portion of the tip 76 is straight, thus complementing the shape of an interior surface of the housing, thereby to impart shear forces to gas bubbles generated and to create a negative or low pressure region at the trailing edge of the tip 76. This arrangement imparts shear forces to the water and the oxidant at the tips of the impeller blades, thereby encouraging highly effective contact between the oxidant and the water which enhances mass transfer between the impurities in the water and the oxidant and hence increases the reaction rate between the oxidant and the impurities.

The impeller blades rotate in a counter clockwise direction when viewed in top plan view. The shape of the trailing edge of each blade is concave when viewed in plan view while the shape of the leading edge of each blade is convex. The shape of the impeller blades causes a low pressure region to be generated, in use, at trailing ends of the tips 76 of the blades. This encourages reintroduction, by a suction action, of the oxidant and the water at the trailing ends of the tips, which in turn enhances mass transfer between the impurities in the water and the oxidant.

The device 10 is intended particularly for use for treating halogenated aliphatic hydrocarbon contaminated water. Such water percolates into the soil matrix 14 and into a water table to cause pollution of the ground water.

Thus, to treat this water, the contaminated water is drawn into the interior of the casing 22 by the pump 16. At the same time, ozone from the ozone generator 30 is injected into the mass transfer device 20 via the feed conduit 34. In addition, if provided, hydrogen peroxide from a source (not shown) is injected into the mass transfer device 20 via the feed conduit 36.

In the mass transfer device 20, the impellers 74 rotate and ozone gas, in the interior 66 of the mass transfer device reacts with the contaminants in the water to cause oxidation of the contaminants to harmless by-products. Most of the oxidation occurs within the mass transfer device 20 and this oxidation is enhanced due to the shape and configuration of the impeller blades 74 of the impeller assembly 64. The impeller blades are shaped and dimensioned to impart centrifugal forces to the water and the oxidant thereby accelerating the water and oxidant in a radial direction towards the tips of the blades for expelling the water and the oxidant through the openings 62 in the side wall 60 of the housing. The openings are sufficiently small so as to produce a shearing effect on the water and the oxidant as they pass through the openings 62. This further enhances mass transfer between the impurities in the water and the oxidant and thereby increases the reaction rate between the impurities and the oxidant. Those bubbles which collect on the impellers 74 are driven by centrifugal force to the impeller tips 76 where they are "squeezed" by the impeller tips 76 imparting shear forces thereto and to be expelled through the openings 62 in the side wall 60 of the housing 54. The creation of the low pressure region at the trailing edge of the impeller tips 76 increases the oxidation rate as explained hereinabove.

The treated water is then pumped by the pump 16 into the part 42 of the interior 22 of the borehole casing 12 where, if the part 42 contains activated carbon, the oxidation process is enhanced. The treated water is thus retained in the part 42 so as to allow further reaction between the reagent and impurities in the water to take place.

When the treated water reaches the upper packer 28 it is discharged into the discharge tubes 48 of the discharge conduit 46. The water is discharged through the outlet openings 50 of the discharge conduits 48 into the soil matrix 14 to percolate through the soil matrix. The number and size of the discharge conduits 48 will be dependent on the radius of influence of the borehole, the soil permeability and hydraulic parameters.

Also, due to the discharge of the treated water into the soil matrix 14, the equipment 10 may be operated by introducing excess ozone into the mass transfer device 20. This excess ozone is entrained in the treated water as it is pumped through the interior 22 of the borehole. Thus, the treated water, when it is discharged through the outlet opening contains residual ozone and, where utilized, hydrogen peroxide with the resultant hydroxyl radicals. This treated water, together with the residual oxidants further oxidises absorbed or organic contaminants in the soil matrix 14 to effect soil washing and leaching and stimulate bacterial activity for further breakdown of adsorbed soil contamination.

It will be appreciated that the ozone generator may be replaced with a supply of a reducing agent in the form of hydrogen. Hydrogen is thus pumped into the mass transfer device to effect reduction of the contaminants in the water.

Figure 4:
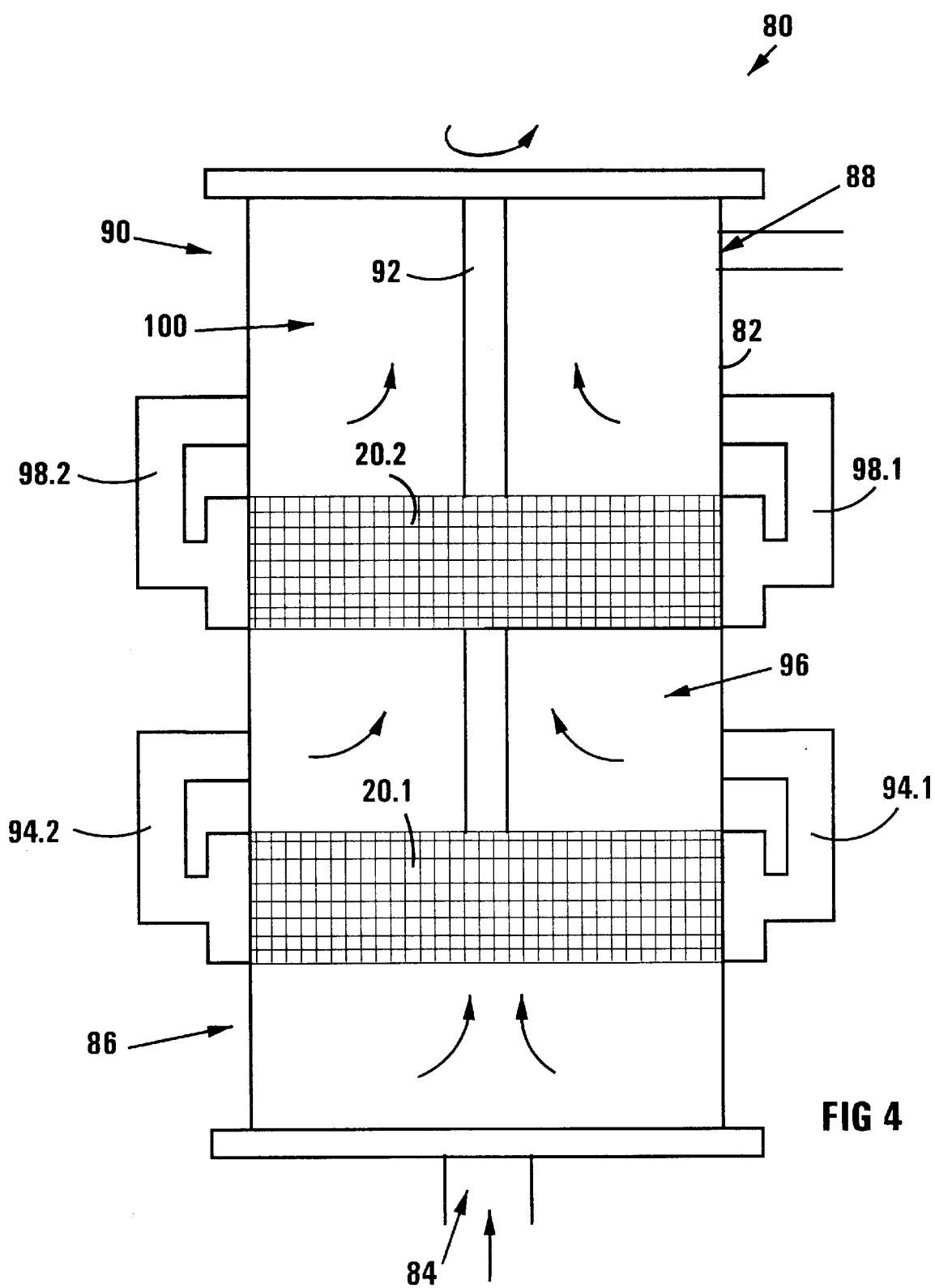
FIG. 4 shows a schematic sectional side view of equipment, in accordance with another embodiment of the invention, for treating contaminated liquids.

Referring now specifically to FIG. 4 of the drawings, equipment, in accordance with another embodiment of the invention, for treating contaminated liquid, is illustrated and designated by the reference numeral 80. The equipment 80 comprises a vessel 82 which is positioned at ground level. It will be appreciated that the vessel 82 could also be positioned in a borehole.

A first and a second mass transfer device 20.1 and 20.2 are mounted inside the vessel 82. An inlet 84 is defined at a bottom end 86 of the vessel 82 and an outlet 88 leads from a top end 90 of the vessel 82. The mass transfer devices 20.1 and 20.2 are interconnected by means of a central shaft 92 which is in use driven by an electrical motor (not shown) mounted outside the vessel 82.

Flow pipes 94.1 and 94.2 lead from the first mass transfer device 20.1 to an interior region 96 of the vessel 82 and flow pipes 98.1 and 98.2 lead from the second mass transfer device 20.2 to an interior region 100 the vessel 82. In use, impure water is pumped into the vessel 82 via the inlet 84 and is drawn into the mass transfer device 20.1 for treatment as described in FIGS. 1, 2 and 3. In this case however, flow of water which emanates from the first mass transfer device 20.1 is redirected into the region 96 via the flow pipes 94.1 and 94.2 and then into the second mass transfer device 20.2 for further treatment. Water emanating from the second mass transfer device 20.2 is recirculated into the region 100 and is discharged through the outlet 88. It will be appreciated that any number of mass transfer devices 12 may be used inside the vessel 82. In the event that not all of the contaminants which are contained in the impure liquid are destroyed inside the first mass transfer device, the liquid may then be treated further in at least one further mass transfer device to enhance the treatment of the water.

The applicant believes that it is a particular advantage of the invention that water treatment time or remediation time is radically decreased in a cost effective manner. In addition and importantly, no ground water abstraction and no secondary treatment of off-gas are required.

What is claimed is:

1. A mass transfer device for use in the treatment of an impure liquid, the mass transfer device including a housing into which the impure liquid and a reagent are to be introduced, the housing having a foraminous side wall that defines a plurality of openings for allowing the flow of the impure liquid and the reagent therethrough, the openings being sufficiently small to produce a shearing effect on the liquid and the reagent as it passes through the openings; and an impeller assembly that is rotatably mounted within the housing, the impeller assembly comprising a number of impeller blades having tips which are disposed and terminate in close proximity to the openings in an interior surface of the side wall, the impeller blades projecting radially outwardly, flaring outwardly towards the tips, and curved:

to impart centrifugal forces to the liquid and the reagent in the housing for accelerating the liquid and the reagent in a radial direction towards the tips of the impeller blades for expelling the liquid and the reagent through the openings in the side wall of the housing;

to impart shear forces to the liquid and the reagent in the region between the tips of the impeller blades and the side wall of the housing; and to generate a low pressure region at trailing ends of the tips of the impeller blades for encouraging the reintroduction, by a suction action, of the reagent and the liquid thereby to enhance mass transfer between the liquid and the reagent and hence to increase the reaction rate between the reagent and impurities in the liquid.

2. The mass transfer device as claimed in claim 1, in which the tip of each impeller blade has an edge portion which complements the shape of the interior surface of the side wall.

3. The mass transfer device as claimed in claim 1, wherein the tip of at least one of the impeller blades is formed of a catalytic material for enhancing a catalytic reaction between the impurities in the liquid and the reagent.

4. The mass transfer device as claimed in claim 3, wherein the catalytic material is selected from the platinum group metals.

5. The mass transfer device as claimed in claim 1, in which the clearance between the tips of the impeller blades and the side wall of the housing is less then 3 mm.

6. Equipment for treating an impure liquid, the equipment including a vessel into which the impure liquid to be fed, in use;

at least one mass transfer device that is mountable within the vessel, the mass transfer device including a housing into which the impure liquid and a reagent are to be introduced, the housing having a foraminous side wall that defines a plurality of openings for allowing the flow of the impure liquid and the reagent therethrough, the openings being sufficiently small to produce a shearing effect on the liquid and the reagent as it passes through the openings; and an impeller assembly that is rotatably mounted within the housing, the impeller assembly comprising a number of impeller blades having tips which are disposed and terminate in close proximity to the openings in an interior surface of the side wall of the housing, the impeller blades projecting radially outwardly, flaring outwardly towards the tips, and curved;

to impart centrifugal forces to the liquid and the reagent in the housing for accelerating the liquid and the reagent in a radial direction towards the tips of the impeller blades for expelling the liquids and reagent through the openings in the side wall of the housing;

to impart shear forces to the liquid and the reagent in the region between the tips of the impeller blades and the sidewall of the housing; and to generate a low pressure region at trailing ends of the tips of the impeller blades, thereby to enhance mass transfer between the liquid and the reagent and hence to increase the reaction rate between the reagent and impurities in the liquid;

reagent supply mens for supplying reagent to the mass transfer device; and drive means for causing rotation of the impeller assembly inside the housing.

7. The equipment as claimed in claim 6, which includes retention means arranged within the vessel, in which treated water which issues from the mass transfer device, in use, can be retained so as to allow further reaction between the reagent and impurities in the water to take place, thereby to enhance the treatment of the water.

8. The equipment as claimed in claim 7, in which the retention means is arranged between an upper water-impervious packer and a lower water-impervious packer.

9. The equipment as claimed in claim 7, in which the vessel is in the form of a borehole casing sunk into a soil matrix.

10. The equipment as claimed in claim 9, wherein the borehole casing includes openings arranged about its circumference through which the impure water can enter the borehole casing.

11. The equipment as claimed in claim 10, in which only a lower region of the borehole carries the openings.

12. The equipment as claimed in claim 11, which includes a filtering means arranged about an outer periphery of the lower region of the borehole for inhibiting the ingress of detritus into the borehole casing.

13. The equipment as claimed in claim 12, in which the filtering means in the form of graded silica sand.

14. The equipment as claimed in claim 6, which includes a discharge means for discharging treated liquid from the vessel.

15. The equipment as claimed in claim 14, in which the discharge means includes a discharge conduit comprising a plurality of discharge tubes extending radially outwardly from the discharge end of the vessel and having at least one outlet opening which extends into a soil matrix.

16. The equipment as claimed in claim 6, in which the vessel is in the form of a free standing vessel which is used at ground surface level.

* * * * *